(12) United States Patent
Sherry (10) Patent No.: US 10,389,121 B1
(45) Date of Patent: Aug. 20, 2019

(54) EFFICIENT PORTABLE AC/DC POWER GENERATOR SYSTEM

(71) Applicant: Raymond C. Sherry, Cleburne, TX (US)

(72) Inventor: Raymond C. Sherry, Cleburne, TX (US)

(*) Notice: Subject to any disclaimer, the term of this patent is extended or adjusted under 35 U.S.C. 154(b) by 0 days.

(21) Appl. No.: 15/801,460

(22) Filed: Nov. 2, 2017

Related U.S. Application Data (60) Provisional application No. 62/496,945, filed on Nov. 2, 2016.

(51) Int. Cl.
| | |
|---|---|
| *H02J 3/02* | (2006.01) |
| *H02J 7/35* | (2006.01) |
| *H02J 3/38* | (2006.01) |
| *F03D 9/11* | (2016.01) |
| *H02P 9/04* | (2006.01) |
| *H02S 10/40* | (2014.01) |

(52) U.S. Cl.
CPC .................. *H02J 3/02* (2013.01); *F03D 9/11* (2016.05); *H02J 3/383* (2013.01); *H02J 3/386* (2013.01); *H02J 7/355* (2013.01); *H02P 9/04* (2013.01); *H02S 10/40* (2014.12)

(58) Field of Classification Search
CPC .... H02J 3/02; H02J 3/383; H02J 3/386; H02J 7/355; H02S 10/40; F03D 9/11; H02P 9/04
See application file for complete search history.

(56) References Cited

U.S. PATENT DOCUMENTS

| | | | |
|---|---|---|---|
| 2007/0296223 A1* | 12/2007 | Saylor | F02B 63/04 290/1 R |
| 2010/0006668 A1* | 1/2010 | Alexander | B08B 3/026 239/129 |
| 2016/0241031 A1* | 8/2016 | Hooshmand | H02J 3/38 |

\* cited by examiner

*Primary Examiner* — Robert L Deberadinis
(74) *Attorney, Agent, or Firm* — Roger N. Chauza, PC (57) ABSTRACT

An AC/DC generation system that is mobile and can be easily moved from one location to another to provide the AC power and DC power requirements of the user. The electrical power generators are processor controlled and can be configured to maximize the efficiency of the system, as well as reconfigured to substitute backup components for components determined by the processor to be faulty. The efficiency of the system can be optimized by selecting the electrical generator whose use is the most cost effective.

16 Claims, 7 Drawing Sheets

EFFICIENT PORTABLE AC/DC POWER GENERATOR SYSTEM

RELATED APPLICATION

This U.S. patent application claims the benefit of U.S. provisional application Ser. No. 62/496,945, filed Nov. 2, 2016.

TECHNICAL FIELD OF THE INVENTION

The present invention relates in general to AC and DC power generation systems, and more particularly to methods and apparatus for generating, collecting and using various forms of electrical power from several highly integrated components.

BACKGROUND OF THE INVENTION

Gasoline driven auxiliary generators are well known for providing AC power at remote locations. These generators are portable and provide several thousand watts of AC power. The primary and generally the only function provided by such generators is to provide AC power and nothing else. The gasoline fuel required of such engines ages after a short period of time and thus if stored longer than such time, the fuel must be replaced with fresh gasoline. If the engine fails or other critical components fail, then the generator is generally unusable. These portable power generators are thus not considered "smart" as any adjustment, and if they exist at all, must be carried out manually.

From the foregoing, there is a need for a portable power generator that provides not only AC power but also DC power to drive DC voltage equipment such as portable televisions, radios, cameras, lights, etc. There is also a need to provide AC power from sources other than the gasoline engine. There is a consumer need for a programmed processor used by the portable power generator to select the best and most cost effective AC source or DC source for generating power that is available to the user. A further need exists for a portable electrical power generator that can detect defective components and select other backup components to maintain the unit operational.

SUMMARY OF THE INVENTION

In accordance with the principles and concepts of the invention, there is disclosed a portable power generator with components that are processor controlled so that the power generating configuration can be changed to take into consideration the cost effectiveness of using various power sources, and to reconfigure the components should one or more of the components become defective.

According to a feature of the invention, various power sources that can be utilized for generating AC power and DC power for the user include solar power, wind power, AC grid power as well as a natural gas or propane gas driven engine. A subsidiary feature is that a programmed processor is provided to control the selection of one or more of the power sources, based on the cost and availability thereof.

In accordance with a further feature of the invention, the portable power generator is processor driven so as to maintain a spatial orientation so that the solar panels continue to be directed to the sun as the sun moves across the sky. The processor also controls the wind turbine so as to be directed into the direction of the prevailing wind.

A benefit of the portable power generator of the invention is that the engine system can accommodate the heating of water to provide warm water to the user. The warm water can be connected to a hand held shower head, or to provide radiated warm air to the user. The thermal energy of the engine exhaust can also be passed through a flat-top metal enclosure to heat the same and allow food items placed thereon to be cooked or to maintain the food or drink items hot.

A further benefit of the portable power generator of the invention is that the engine can drive a pump to force pressurized lake, stream or ocean water through a reverse osmosis filter to provide the user with fresh potable water. Alternatively, the pump can be connected to a pressure washer type wand to clean surfaces. When used in the pressure washer mode, chemicals and cleaning solutions can be added to the pressurized stream of water, as well as abrasive particles to accelerate the cleaning procedure.

The portable power generator of the invention can be equipped with a small portable refrigerator that is equipped with a temperature control that is controlled by a programmed processor. A thermostat is placed in the refrigerator compartment and is monitored by the processor, whereby when the compartment temperature is to be cooled, electrical power is applied to the refrigerator so that the compressor runs and cools the compartment until the set point is reached, whereupon the processor senses the same and removes the electrical power to the refrigerator.

An additional advantage of the portable power generator of the invention is that the unit can be rotated to achieve proper alignment with either the sun or the wind, or both, by rotating the unit to align the solar panels with the sun, and then to rotate the wind turbine itself to directed it into the prevailing wind. The unit itself can be rotated by the use of a rear axle differential and the use of braking of each axle to control the rotation of the other axle to thereby rotate the unit, and thus rotate the solar panels attached thereto about a vertical axis. The unit can also be mounted to a pedestal so that the unit rotates under processor control with respect to a stationary pedestal and thereby also rotates the solar panels.

A further advantage of the portable power generator is that the unit can be oriented in desired directions at specified night times so that the engine and exhaust noise is directed away from the user's living area. The processor is programmed to determine the time of day, the position of the user's living area, and then to rotate the unit when a quiet time has arrived to minimize noise directed to the living area. The minimization of noise during the quiet time may also involve running the engine at a slower speed, but for a longer time, to charge the battery and make AC and DC power available to the user.

BRIEF DESCRIPTION OF THE DRAWINGS

Further features and advantages will become apparent from the following and more particular description of the preferred and other embodiments of the invention, as illustrated in the accompanying drawings in which like reference characters generally refer to the same parts, functions or elements throughout the views, and in which.

DETAILED DESCRIPTION OF THE INVENTION

Figure 1A:
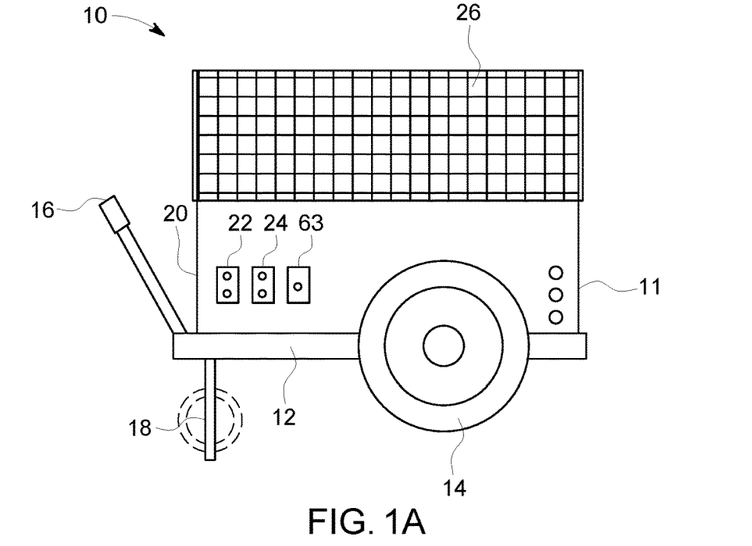
FIG. 1a is a side view of a portable power generator embodying the AC and DC generation system of the invention, with the solar panels hinged down to form side panels to the internal components.

FIG. 1a illustrates a mobile cart 11 to which the portable power generator 10 is fastened so that AC power and DC power is available anywhere the cart 11 can be pulled, driven or otherwise moved. The cart 11 is of conventional construction, including a bed 12 to which a pair of wheels 14 is rotatably fastened, a handle 16 for manually pushing or pulling the cart 11, and a stand 18 for supporting the front end of the cart 11 on the ground when stationary. While only two wheels are illustrated, the cart 11 can be equipped with three or four wheels, one or two of which pivot so that the cart 11 can be either turned around a corner or about a vertical axis. As will be described below, the stand 18 can be replaced with a caster front-center wheel, shown in broken line. The rotation of the cart 11 can be effected to make automatic alignment adjustments. The AC generator, DC alternator, engine, batteries and other related components are located in a small ventilated enclosure or cabinet 20 that is fastened to the bed 12 of the cart 11. The AC generation system provides two or more different electrical outlet circuits, one shown as numeral 22 and the other shown as numeral 24. There can be one AC outlet that is driven by a sine wave inverter, and another AC outlet driven by a square wave inverter. The sine wave inverter can be used to provide high quality AC power to a computer or other equipment requiring high quality AC power.

Figure 1B:
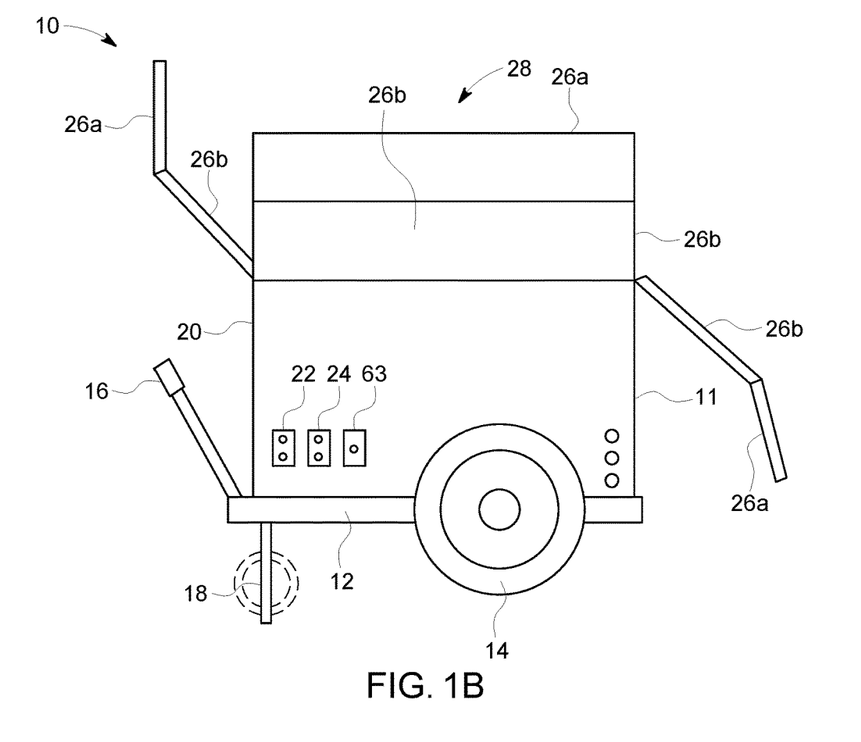
FIG. 1b is a side view of the portable power generator of FIG. 1, illustrating the deployment of the solar panels.

The portable power generator 10 includes plural solar panels, one shown as numeral 26, that are available to charge the battery 52 when the sun is shining. The solar panels 26 are shown in FIG. 1 hinged down against the sidewalls of the cabinet 20 when not in use. While a single hinge can be employed for hinging the solar panels 26 to the cart 11, the panels 26 themselves can be double hinged (as shown in FIG. 1b) so that when folded twice, a more compact arrangement is provided. The solar panels 26 can be automatically folded to a closed position when rain or when nighttime is detected. If bad weather is detected, the solar panels 26 can be folded to the closed position to protect the inner components of the cart 11 from damaging hail or rain. The portable power generator 10 can be equipped with rain sensors to detect the occurrence of rain and to automatically fold the solar panels 26 to the closed position and thus protect the inside equipment of the generator 10. Also, if the production of DC power from the solar panels 26 is sufficiently reduced due to cloudy conditions, and the same is detected by the processor 34, then the solar panels 26 can then be folded to the closed positions and provide protection to the inside equipment should the cloudy condition lead to rain.

Figure 2A:
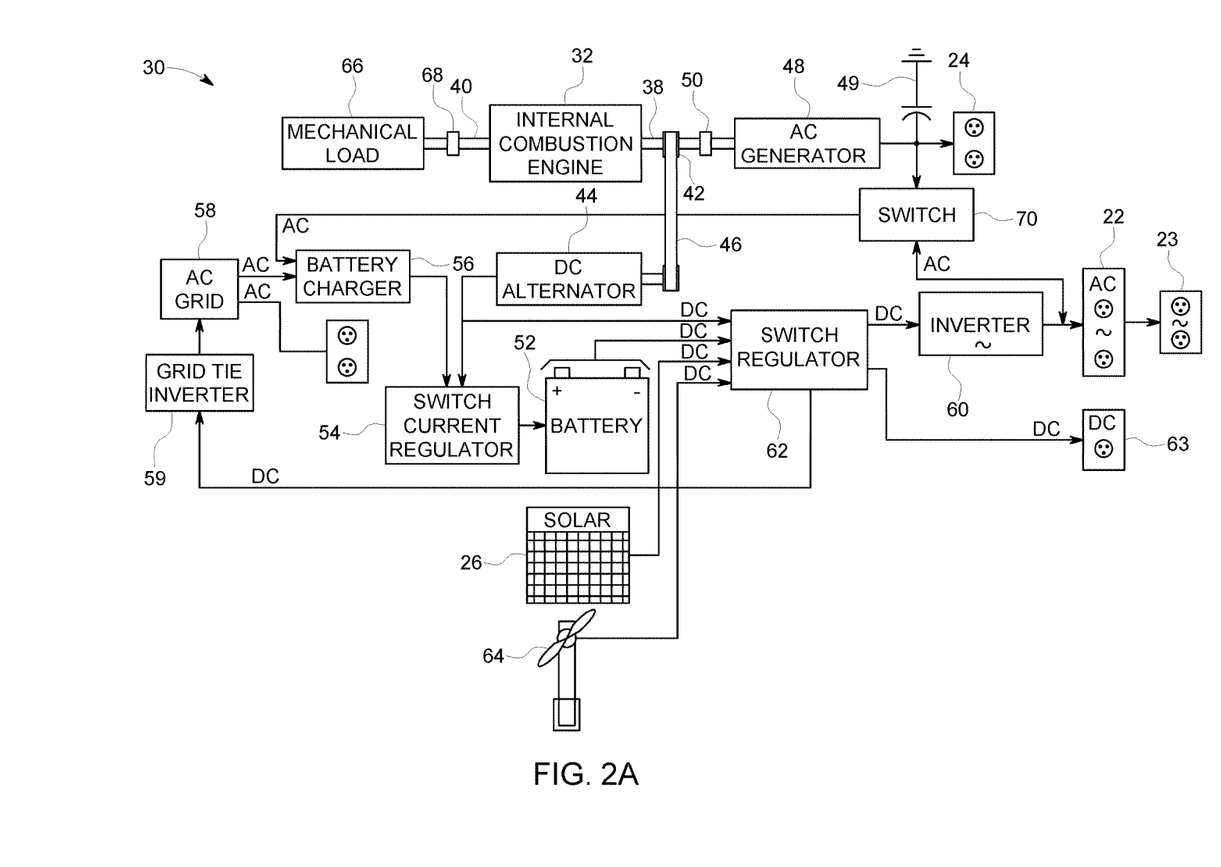
FIG. 2a is a diagram of the components of the AC and DC generation system according to an embodiment of the invention.

A DC outlet 63 is available to provide DC power to various components and appliances (such as a microwave, DC lights, etc.) that are adapted for using the same. While the system is illustrated mounted to a cart 11, it can be mounted to a stand that rests on or is fastened to the bed of a truck, a trailer, or the like. In practice, the cart 11 can be mounted to a surface by a pedestal 130 (FIG. 8) that is rotatable. Irrespective of the manner in which the cart 11 is mounted to wheels or to a surface, the cart 11 is rotatable to either align the solar panels 26 with respect to the sun, or align the wind turbine 64 of FIG. 2 with respect to the prevailing wind. As will be described below, the portable power generator 10 is processor controlled to sense when the solar panels 26 receive the maximum amount of sunlight, and when the amount of sunlight incident to the solar panels 26 is reduced, the cart 11 is rotated so that the maximum amount of sunlight striking the solar panels 26 is again maximized. When the sun is unavailable to the solar panels 26, due to either cloudy or rainy days, or at nighttime, the cart 11 can be rotated to align the wind turbine to the wind, if a wind is sensed by the processor 34.

The portable power generation system 10 is readily adapted for use by tailgaters, campers, preppers, etc., where a mobile and cost effective power generation system may be critical to living or survival. The power generation system 10 can be easily carried or transported by a small truck, camper, RV unit, or the like and can even be mounted on a licensed trailer for pulling to any destination where the users will be camping or staying for a short period of time. In this latter case, the licensed trailer would be equipped with a tongue and hitch for mounting to the ball of the vehicle hitch. The time in which the system can be employed is generally a function of the amount of fuel that is either carried or available at the site and used by the engine 32. The amount of fuel that is carried by the cart 11 is also a function of the expected amount of sunshine and/or wind that is available, as well as the battery power that is available, and the duration of time in which the cart 11 that is expected to be used. While not shown, the electrical outlets 22, 24 and 63 can be mounted to an enclosure box that can be pulled out of the cart 11 using one or more umbilical electrical cords, so that the plug-in outlets are located away from the engine 32 and other components mounted to the cart 11.

FIG. 1b illustrates the portable power generator 10 with the solar panels 26 double hinged to a position to maximize the incidence of sunlight 28 thereon. The solar panels 26 can be hinged to the cabinet 20 and include respective brackets that allow the panels 26 to be maintained at different angles to allow continued adjustment as the sun moves across the sky. Further, a bottom edge of the top solar panel 26a can be hinged to a top edge of the bottom solar panel 26b to allow the arrangement to be folded into a more compact area. The solar panels 26a and 26b are connected to each other and to the cart 10 with metal straps or cables, and to respective DC motors so that the panels 26a and 26b can be deployed at any angle so as to maximize the sunlight that strikes each panel 26. With this arrangement, the solar panels 26a and 26b can be folded into a compact area to cover the top of the cart and provide protection of the internal components. As will be described below, the solar panels 26 are movable at different positions between the fully open and the fully closed positions by DC motors controlled by the programmed processor 34. Also, the cart 11 is rotatable to align the solar panels 26 with the direct sunlight. Accordingly, with both of these solar panel movements, it can be assured that the direct incidence of sunlight onto the solar panels continues as the sun moves across the sky.

While not shown, a solar panel 26 can be located on the top panel of the cabinet 20. As an alternative, or in addition to a top-mounted solar panel 26, a propane gas cook top stove (not shown) can be built into the cabinet 20, underneath a hinged or folded top solar panel 26. As will be described in more detail below, the DC power generated by the solar panels 26 is utilized for both charging one or more batteries 52, as well as directly providing power to DC-operated components, for providing DC power to the inverter(s), and bypass the batteries if the battery supply 52 fails. Processor controlled electrical switches can be utilized for interconnecting the components of the cart 11 to automatically connect the components in the manner desired by the programmed processor 34. The interconnection of the various electrical components can be accomplished by the programmed processor 34 to maximize efficiency and to reroute power if one or more electrical components fail. The batteries 52 are used to drive one or more inverters 60 and deliver AC power to one or more of the AC outlets 22. The DC power generated by the portable power generator 10 can also directly drive DC powered appliances or other DC driven equipment. The DC generators of the portable power generator 10 include the battery 52, the solar panels 26 and the wind-driven turbine 64. Processor controlled switches can be utilized to allow DC power to be delivered to DC components of the portable power generator 10 by one or more of the DC alternators 44. An engine-driven AC generator 48 provides AC power for the other AC outlet 24. As an alternative, the solar panels 26 can all be hinged so as to rest in a layered configuration on the top or the side of the cabinet 20. When folded in this arrangement, the top-most (or side) solar panel(s) will have a weather-proof outer surface to prevent damage by the elements, including rain and hail.

The portable power generator 10 is expected to weigh about 300 pounds when fully equipped, and thus can also be permanently or temporarily mounted on the bed of a pick-up truck, or trailer, and moved to remote locations to provide AC power and DC power to drive power tools, appliances, lights and other AC/DC powered equipment. When mounted to the bed of a truck or to a trailer, the cart 11 is preferably mounted to the vehicle surface by a pedestal 130 that is rotatable under control of the processor 34. In this manner, the pedestal 130 rotates to thereby rotate the cart 11 and align the solar panels 26 with respect to the sun, or align the wind turbine 64 with respect to the wind, or to assure the exhaust and noise of the internal combustion engine 32 is oriented downwind to minimize noise to the living area of the site. The use of a rotatable pedestal 130 also prevents the cart 11 from being stolen. The portable power generator 10 can also be used as auxiliary power for households in the event that the grid power temporarily fails. Various household appliances can be powered, such as a microwave, refrigerator, television and lights, until the AC grid power is restored. To that end, the AC power expected to be generated by the engine/AC generator set is about 3,500 watt continuous. The DC power produced and made available for use can be up to 48,000 watt for short periods of time, by the use of four 12-volt lead acid type batteries 52, each of which has the capability of delivering over 1,000 amps for short periods of time, and a capacity of about 100 continuous ampere hours of DC current.

FIG. 2a illustrates the electromechanical components 30 of the portable power generator system 10 according to an embodiment of the invention. Those skilled in the art may desire to supplement the generator system 10 with other components. The generator system 10 includes a single or multiple cylinder internal combustion engine 32 that is fueled by any type of fuel, such as gasoline, diesel, propane, natural gas, hydrogen, etc. The engine 32, as well as the other components of the system 10, are controlled by a programmed processor 34, computer, or controller, etc., as illustrated in detail in FIG. 2b. The processor 34 includes a bus coupled to an interfaces 36a and 36b, where the I/O of the interface 36a is coupled to sensors for sensing the status and automatic/continuous control of the various components, and other I/O ports of interface 36b are coupled to the components of the generator system 10 to control the same in response to the sensors.

In the preferred embodiment, it is contemplated that the engine 32 will be a 5.5 horsepower engine, driven by propane gas contained in a pressurized portable tank. One or more propane tanks can be mounted to the cart 11, much like an RV. It is noted that either propane or natural gas does not deteriorate over time while stored in a pressurized container. In addition, the cost of operation of the engine 32 is much lower when powered with propane or natural gas, as compared to gasoline or diesel. During operation, the engine 32 can run at 3,600 rpm (or at a different speed) so that the AC generator 48 produces 60 Hz power. When the AC generator 48 is not required, the engine 32 can operate at lower speeds. The engine 32 is of the type that includes a crankshaft that includes an end 38 that extends out of the front of the engine 32, and an opposite end 40 that extends out of the other side of the engine 32. The front crankshaft end 38 is connected to a pulley 42 which drives a DC alternator 44 via either a ribbed belt 46 or a V-belt. The pulleys to which the ribbed belt 46 is connected have a ratio such that when the pulley 42 rotates at a maximum of about 3,600 rpm, the DC alternator 44 rotates at a maximum speed of about 2,000 rpm, or at another efficient speed for operating the DC alternator 44. It is noted that the horsepower of the engine 32 should be matched with the capacity of the DC alternator 44, it being understood that when using small engines to conserve weight and fuel, the DC alternator 44 can present a large load that can stall the engine 32.

The front crankshaft end 38 is also connected to the AC generator 48 through a clutch 50. The clutch 50 can be of the type that is electrically controlled (magnetic clutch), but could be a manual clutch, or other type. When placed on line, the AC generator 48 provides a 60 Hz, 120 VAC output at 3,600 rpm. The amperage output by the AC generator 48 can be up to about 33 amps, thereby providing about 4,000 watts of AC power. In order to accommodate electrical surges in the load current, one or more AC capacitors 49 can be connected to the output terminals of the AC generator 48. In order to compensate for high inrush load currents, a flywheel (not shown) can be connected either to the engine crank shaft 38, or to the shaft of the AC generator 48. The AC power generated by the AC generator 48 is connected to one or more outlets 24. While a single phase 120 VAC generator 48 is illustrated, a single 220 VAC generator, or multiple AC generators, could also be employed to power 220 volt electrical equipment. It is noted that the pump 96 of FIG. 4, the AC generator 48 and DC alternator 44 can all be connected and driven via the front engine crankshaft end 38 using a standard pulley/belt arrangement (not shown). Other equipment can be driven by the back engine crankshaft end 40.

As noted above, the portable power generator 10 includes a second AC outlet circuit 22 that is independent of the outlet circuit 24 powered solely by the AC generator 48. The DC alternator 44 is a source of power for charging one or more batteries 52 for powering the second AC circuit 22 via an inverter 60. Each battery 52 is preferably a twelve-volt lead-acid battery with a minimum rating of 100 ampere/hour. While a single battery 52 is illustrated, a bank of batteries can be utilized to increase the duration of time in which AC power is delivered to the second AC outlet circuit 22. A processor-controlled switch 54 allows the battery 52 to be charged by either the DC alternator 44, or by an optional battery charger 56 which is driven by the AC power of the grid 58, when available. The battery 52 can also be charged by the DC voltage produced by the solar panels 26 should a charging component become defective. When the system 10 is idle or not in use, the top solar panel 26 can provide the small amount of power to operate the processor 34 as well as to maintain the battery 52 fully charged. When the AC grid power is available, the battery 52 can be charged by the AC grid 58, thereby reducing the load on the engine 32 and the AC generator 48. In any event, the batteries 52 remain charged so that if needed to product DC power therefrom, or AC power via the inverter 60, DC current is readily available. Indeed, while the batteries 52 are being used to provide DC power to the user of the system 10, the batteries 52 are also being charged by the charger 56, via one of the available AC sources.

AC power delivered to the second AC outlet circuit 22, or to an additional AC outlet, is provided by one or more sine wave inverters 60. As can be appreciated, a sine wave inverter 60 can drive one AC outlet circuit, and a square wave inverter can drive a different AC outlet circuit. The inverter 60 can be driven by multiple sources of DC power, as selected by a processor-controlled switch 62. The switch 62 can switch DC power to the inverter 60 from the battery 52, the solar power panels 26, the wind-driven alternator 64 or other DC sources not shown. Depending on the type and capacity of the inverter 60 employed, it is expected to deliver up to about 10,000 watts of AC power to the outlet circuit 22. The inverter 60 can be of several types, including a pure sine wave inverter, or a modified sine wave inverter which can generally produce more output power than a comparable pure sine wave inverter. The inverter of choice can be selected for different DC voltage inputs, including 12, 24 or 48 VDC. If a 48-volt input inverter is employed, then four 12-volt DC batteries can be placed in series to provide 48 VDC. As an alternative, both a pure sine wave inverter and a modified sine wave inverter can be used in the system 10, and respective outlet AC outlet receptacles can be used so that the user can connect equipment that requires a pure sine wave AC power to one outlet, and other equipment that can operate on the modified sine wave power can be connected to the other AC outlet receptacle. Each AC receptacle can be marked accordingly so that the user knows which AC receptacle provides which type of AC power.

As an option, a mechanical load 66 can be connected to the engine 32 via the electrically-controlled clutch 68, such as a processor controlled magnetic clutch, or other standard drive methods and techniques. In other words, while the crankshaft end 38 of the engine 32 is driving the AC generator 48, the torque of the other crankshaft end 40 can drive the mechanical load 66. The mechanical load can be of various types, including a pump or pressure washer, an air compressor, etc. In addition, a second AC generator head can be driven by the crankshaft end 40.

It is understood that the most efficient mode of operation of the portable power generator 10 is via the solar panels 26, or the wind turbine 64, without operation of the engine 32. According to another mode of operation of the portable power generator 10 when the solar energy and the wind energy are not available or the respective DC producing components have failed, the engine 32 runs intermittently at a lower speed to maintain the battery 52 charged. With this mode of operation the battery 52 is the sole DC source of power to drive both the inverter 60 and directly drive other DC loads via the DC outlet 63. In this mode the clutch 50 or other drive system is disengaged so that the AC generator 40 is off line and it delivers no AC power to the outlet circuit 24. In operation according to this mode, the battery 52 delivers DC power to the inverter 60 via the switch 62. The inverter 60 converts the DC power to sine wave (or modified sine wave) AC power and delivers the same to the outlet AC circuit 22. It can be appreciated that while the battery 52 delivers DC power to the inverter 60, the battery 62 continues to discharge. The processor 34 monitors the voltage of the battery 52 and when a low threshold is reached, such as 11.0 volts for a twelve-volt battery, the processor 34 controls the engine 32 to start and be brought up to a charging speed, whereupon an optional clutch (not shown) is operated so that the pulley 42 drives the DC alternator 44 via the belt 46. The optional clutch may not be necessary. The speed of the engine 32 is processor controlled as a function of various parameters. The engine speed can be adjusted by the processor 34 to charge the battery 52 as a function of the electrical load placed on the system 10, whether power from the solar panels 26 or the wind turbine 64 is available, and preset sound limits of the generator system 10 required by the site for evening hours. At night, for example, many parks require that the sound limit be reduced. In this event, the processor 34 can sense the time of day and if the sound limit is to be reduced, the engine rpm is reduced to reduce the sound or noise thereof.

The switch 54 is preferably switched to couple the DC alternator 44 to the battery 52 before the engine 32 begins to drive the DC alternator 44. In any event, the engine 32 is controlled to drive the DC alternator 44 and produce a DC charge current for the battery 52 to charge it while the battery 52 is delivering DC power to the inverter 60. Integrated into the switch 54 is a conventional current regulator for regulating the current that charges the battery 52. The current regulator 54 can be of the type using pulse modulated techniques. The current regulator monitors the DC current required by the load and limits it so that excess DC current draw does not stall the engine 32. The DC current load that will stall the particular engine used is stored in the database of the processor 34. The DC current is regulated by appropriate circuits in the switch 54 to start limiting the current draw before reaching the stall current. During charging of the battery 52 with the engine 32, the processor 34 monitors the terminal voltage of the battery 52 and when fully charged (14.4 volts) the engine drive to the DC alternator 44 is removed, and the engine 32 can be shut down. As an alternative, even though the battery 52 is fully charged, the engine 32 can continue to run to produce thermal energy to heat things, such as water or the environment of the user. The thermal energy given off by the engine 32, such as that from the exhaust, can pass through a flat top chamber to heat the outer surface thereof. The heated top surface of the chamber can be utilized to cook food, maintain food warm, percolate coffee, provide heat to the user, etc. The foregoing process continues throughout the need for AC power at the outlet circuit 22 to keep the battery 52 charged so that it can deliver DC power to the inverter 60. If the processor 34 determines that the engine 32 is starting and stopping too often to maintain the battery 52 in a charged state, then the processor 34 can operate a routine in which the engine 32 remains running at an optimum speed to balance charging of the battery 52 while at the same time supplying DC power to the DC load circuits of the system 10. This reduces wear on the engine starter and other components, and increases engine efficiency.

As noted above, the switch 54 and associated current regulator controls the delivery of DC current to the load to prevent the engine 32 from being overloaded, and to optimize the generator system 10 to produce the most efficient operation. When the engine 32 is driving the AC generator 48, then the engine 32 is required to operate at a given and constant rpm. Otherwise, the engine 32 can operate at various speeds. It is appreciated that the faster the DC alternator 44 operates, the more DC current is produced, up to a limit. Thus, the engine 32 can operate at various speeds under control of the processor 34 to drive the DC alternator 44 to produce DC current. The processor 34 stores in a database the torque/speed curve of the particular engine 32 being utilized with the cart 10. With a given DC load, which can be sensed by the processor 34, the optimum engine speed can be determined by the processor 34. Thus, the processor 34 can control the engine throttle to produce a speed that provides the optimum torque that is needed to drive the DC alternator 44 to charge the battery 52 while it also provides DC current to the various loads, including the inverter 60. For example, the DC alternator 44 can produce various DC current outputs as a function of its rotational speed. This information is stored in the database of the processor 34. For a total electrical load driven by the DC alternator 44, which can be sensed by various sensors, the processor 34 can consult the torque/speed characteristics of the engine 32 and control the engine to provide a speed that is necessary to drive the DC alternator 44 to produce all of the DC current that is needed at that time. As the DC load on the DC alternator 44 changes, the processor 34 continuously changes the speed of the engine 32 to achieve a new optimum speed to drive the DC alternator 44. Accordingly, as the DC load changes dynamically, the speed of the engine 32 also changes, as controlled by the processor 34.

For momentary load increases, for example, the turning on and then off of a spotlight for security purposes, it is not necessary to change the speed of the engine 32. Rather, the additional DC current required of the spotlight is supplied by the battery 52. When the processor 34 responds to the security warning by turning on the spotlight, the switch 62 is operated by the processor 34 to switch the battery 52 to the load, together with the DC alternator current to provide momentary current to the spotlight. If the user of the system 10 manually operates the spotlight, the processor 34 also senses this change in the status of the spotlight by appropriate sensors, and switches on line the battery 52 if it is not already switched to provide DC current to the respective loads. If the spotlight is maintained in the on status for a time period greater than a predetermined period, then the engine speed is increased so that the DC alternator 44 supplies the additional DC current to the spotlight load. For DC currents that exceed the stalling of the engine 32, the battery 52 can provide the additional DC current so that both the DC alternator 44 and the battery 52 supply DC current to the increased loads.

A mode of operation is to use of the battery 52 to deliver DC power to both the inverter 60 and directly to DC loads is accomplished by using the intermittent operation of the engine 32 to drive the DC alternator 44, together with using the solar panels 26 and the wind turbine 64 to recharge the battery 52. This mode is the most cost effective way to operate the portable power generator 10. Depending on component efficiencies and the price of fuel, and if gasoline were to be used as the fuel of choice, the intermittent use of the engine 32 to drive the DC alternator 44 to keep the battery 52 charged and provide AC power at full load via the inverter 60 to the outlet circuit 22, would require considerably less fuel then when the engine is operated continually at full speed. As can be appreciated, the portable power generator 10 is most economically used by driving only the AC outlet circuit 22, or other DC loads directly, and if additional AC power is needed, then the clutch 50 can be engaged and the engine 32 is brought up to speed so that AC power from the AC generator 48 is delivered to the other AC outlet circuit 24. The term "engaged" means that the clutch 50 is operated to couple the engine 32 to the AC generator 48.

The AC output of the generator 48 is connected by switch 70 to one AC input of the battery charger 56, and the AC grid 58 is connected to another AC input of the battery charger 56. The battery charger 56 can thus be charged by either AC sources, as automatically selected by the processor 34 or manually via a switch by the user. The switch 70 is connected between the inputs to the AC outlet circuits 22 and 24. In the event that the AC generator 48 becomes defective, then it can be detected by the processor 34, whereupon the AC generator 48 can be taken off line. The processor 34 can then operate switch 70 so that the AC power delivered by the inverter 60 (from the battery 52) can be coupled not only to the outlet AC circuit 22, but also to the outlet AC circuit 24. Conversely, if any of the components in the DC circuit become defective, such as the DC alternator 44, the battery 52 or the inverter 60, the processor 34 can detect the same and remove such components from operation. The processor 34 can then operate switch 70 so that the AC generator 48 provides AC power not only to the outlet circuit 24, but also to the outlet circuit 22. While the clutches are described herein as being processor controlled, i.e., electrically operated clutches, the clutches can also be manually operated, and sometimes eliminated, to save cost and to conserve the consumption of electrical energy.

In terms of the efficient operation of the system 10, the DC alternator can be driven by the engine 32 at the minimum speed to both supply the DC requirements of the various loads, as well as minimize the engine noise. It is well known that the engine noise is directly related to the speed of the operation of the engine 32. Also, running the engine 32 at the minimum speed also conserves fuel. As noted above, the engine 32 can be intentionally operated at an excess speed to provide thermal energy for use by the user of the system 10. The optimization of operation of the generator system 10 is also accomplished by considering the cost of fuel for the engine 32 as compared to the cost of AC power from the grid 58, when the AC grid power is available. AC power is available at many campgrounds, but is generally not available at "dry" campgrounds.

It is recognized that AC power can be provided by either or both the AC grid 58 and/or the AC generator 48. The cost for using a kilowatt hour of AC power from the grid 58 can be maintained and updated in the processor database. In addition, the cost of fuel for the engine 32 can be maintained and updated in the processor database. Periodically, the processor 34 can carry out a routine to determine if it is more cost effective to produce AC power using the grid 58, or by using the engine 32 for driving the AC generator 48. This of course is applicable if power from the AC grid 58 is available at the site of operation of the system 10. When this condition exists, the processor 34 determines if it is more cost effective to use the AC grid 58 or operate the engine 32 to drive the AC generator 48. Based on the determination, either the AC grid 58 is switched for use by the generator system 10, or the engine 32 is used to drive the AC generator 48. There may be situations where some mix of both is the best for the most reliable and efficient operation of the generator system 10. The processor 34 can also employ the time of day in the determination of which AC source to use. For example, the processor 34 can determine by sensors whether it is day or night, and if day and if the sun is shining and/or the whether the wind exists with a sufficient speed. If either or both sunshine and wind is available, then this free source of power can be switched by the processor 34 to the inverter 60 to provide AC power with no cost at all. Again, if the AC generator 48 or the solar or wind driven inverter 60 produces excess AC power, such power can be routed back to the AC grid 58 via a grid tie inverter 59.

In the event that the AC grid is not available, or fails to deliver AC power to the generator system 10, the processor 34 can operate switch 62 to couple the DC current provided by either or both the solar panels 26 or the wind turbine 64 to charge the battery 52. A voltage regulator can be utilized to allow the appropriate DC voltage level to charge the battery 52.

The portable power generator 10 can also be configured to provide excess AC power to the AC grid 58 and obtain a credit to the account of the user/owner of the generator system 10. During periods when the AC generator 48 is able to produce excess AC power, such power is used to drive the battery charger 56 to charge the battery 52. The DC current of the battery 52 is switched by switch 62 to the grid tie inverter 59. The grid tie inverter 59 is of conventional construction to transform the excess DC current into corresponding AC current in phase with that of the AC grid 58. The DC current from the battery 52 can be supplemented by the DC current of the solar panels 26 and the DC current of the wind turbine generator 64.

It can be appreciated that the portable power generator 10 can also be configured and reconfigured with various components and backup components to provide continuous operation even if one component becomes defective. In order to provide optimum reliability of the generator system 10, the critical components can be duplicated with backup components. The operation of the online components can be monitored by the processor 34 to verify proper operation and to sense when the component has failed. The online components and the backup components can be connected and disconnected by processor controlled switches (not shown). Further, and as noted above, the power generated by various components can be routed and rerouted to other components to generate the output power of the system 10 in an efficient manner. For example, if there is solar power available and/or wind power, then the processor 34 can sense these conditions and switch the solar and/or wind power to the inverter 62 to supplement the AC power output by the AC generator 48. Alternatively, if sufficient AC power can be generated by the solar panels 26 and/or the wind generator 64, then the engine 32 can be idled or stopped, whereby the inverter 62 is the sole AC source of the generator system 10. As to the charging of the battery 52, the various switched currents to charge the battery 52 include the solar panels 26, the wind turbine generator 64, the AC grid 58 through the charger 56 and the DC alternator 44. Accordingly, the processor-controlled switches can configure or reconfigure the various components to optimize operation of the system 10. As a further example, in the event the switch 54 became defective, either the backup switch can be switched into operation, or the DC alternator 44 can be switched by switch 62 to the battery 52 to charge it, thereby bypassing the switch 54.

In the event that additional AC power is required at the AC circuits 22 and 24, and the battery 52 has failed, then the switch 54 can be controlled to remove the alternator 44 from the battery 52, and the switch 62 can be controlled so that the DC alternator provides DC power directly to the inverter 60. In this manner, the engine 32 provides the torque to continually provide power to the inverter 60 as well as the AC generator 48. The outlet AC circuit 22 will thus be powered by the inverter 60, and the outlet AC circuit 24 will powered by the AC generator 48. While the various switches are described herein as being processor controlled, i.e., electrically-operated switches, the switches could also be manually operated to save cost and to conserve the consumption of electrical energy.

In the event that the DC alternator 44 fails, and grid power is available, then the battery charger 56 can be switched via the switch 54 to the battery 52 to maintain a full charge and provide DC power to the inverter 60. The DC alternator 44 can be taken off line by a clutch or otherwise so that it is not driven by the engine 32. The switch 62 is of the type which drives both the inverter 60 as well as DC loads directly via the DC outlet 63. The switch 62 is either manually operated or under processor control to allow any one of the four DC inputs to be switched to both DC outputs.

Figure 2B:
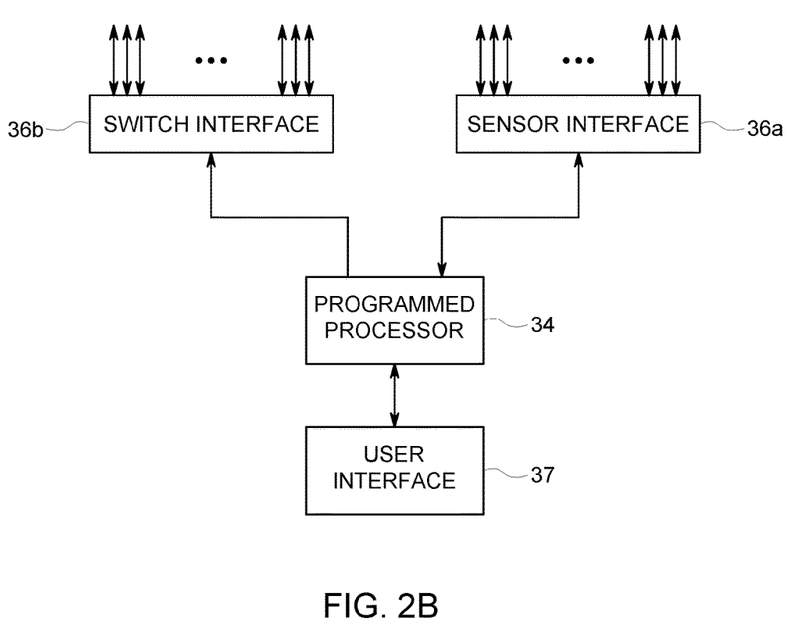
FIG. 2b is a block diagram of the programmed processor coupled to switches for controlling components of the system, and coupled to various sensors for sensing parameters necessary for efficient operation of the system.

FIG. 2b is a block diagram of the processor 34 and associated circuits and sensors. The processor 34 includes sufficient dynamic and static memory to function according the described operation. A sensor interface 36a is employed to provide access to the various sensors that sense parameters necessary to maintain the desired operation of the portable power generator 10. The sensors include, but are not limited to those that receive video data from a camera, audio sensors that sense sound surrounding the system 10, a wind direction and magnitude sensor, solar sensors that sense when the sun is shining sufficiently, an engine speed sensor, AC generator rotation speed sensor, electrical load sensors, cart orientation sensor, solar panel orientation sensors, AC grid availability sensors, axle brake sensors, and other sensors.

A second interface 36b provides access by the processor 34 to the various switches and other apparatus that can be operated to control the path of the AC and DC currents through the system 10. The switch operation is described in detail herein. The processor 34 can send control signals via the second interface 36b. For example, the processor can send control signals to be transmitted via the telemetry system so that a remote user can receive the same. Control signals can also be sent to the camera to control pan and tilt positions. A user interface 37 is provided so that the user can input information therein so that the processor 34 can control the components in accordance therewith. The user interface 37 may include a touch screen, a mouse, a keyboard or other conventional user interface equipment. The processor-related equipment may also include Wi-Fi apparatus so that the user and the unit can transmit and receive information by wireless means.

Figure 3:
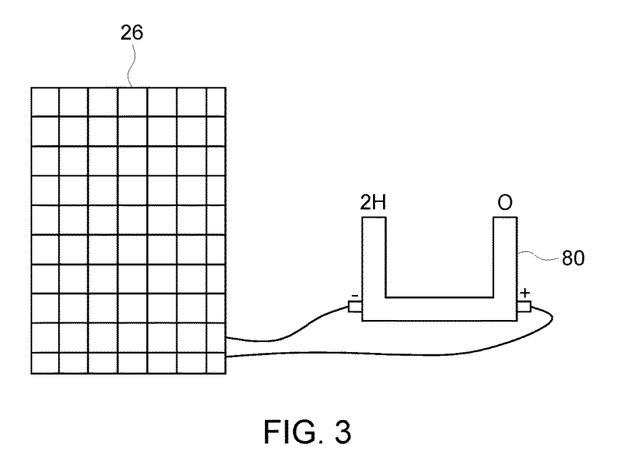
FIG. 3 is a diagram of a hydrogen generator powered by a solar cell.

With reference to FIG. 3, there is illustrated the utilization of a hydrogen generator 80 that is powered by a solar cell array 26. The hydrogen generator 80 can be of the Hoffman type or other type of generator which produces hydrogen separately from oxygen. The hydrogen gas is generated by the negative generator electrode, and oxygen is generated by the positive generator electrode. The oxygen gas and the hydrogen gas can be collected separately, compressed by a compressor and stored in respective containers for use by the engine 32. The solar cell array 26 produces the voltage and current necessary to ionize either a water-based electrolyte, a lye-based electrolyte (sodium hydroxide) or other suitable electrolyte and produce the oxygen and hydrogen gasses. A saline substance can be added to the water-based electrolyte to improve the conductivity thereof. The hydrogen gas can then be injected into the fuel intake system of the engine 32 and either supplement the existing fuel, or can be the sole source of fuel for the engine 32. In order to control the hydrogen flame propagation rate, a calibrated amount of water can be injected as a mist into the carburetor of the engine 32. The separated oxygen can also be injected into the engine 32 to improve the combustion efficiency thereof. In addition, a lubricating mist can be injected into the air intake of the engine 32 to improve lubrication of the moving parts if natural gas, propane or hydrogen is used as the engine fuel.

Figure 4:
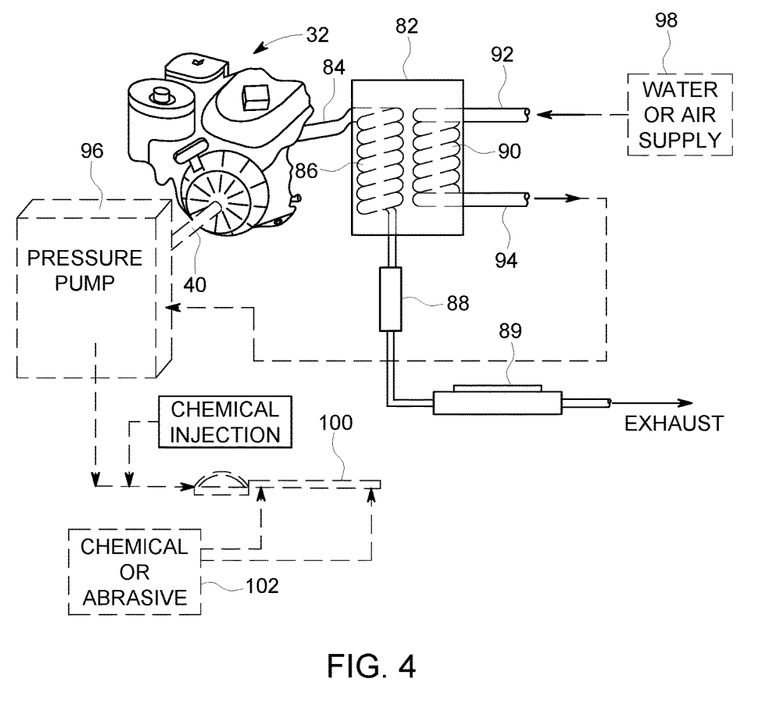
FIG. 4 is a diagram of a heat exchange system for transferring engine heat for use elsewhere, and illustrates in broke line a pressure washing system.

FIG. 4 illustrates the internal combustion engine 32 and a heat exchanger 82. The exhaust pipe 84 of the engine 32 is coupled to a primary coiled tube 86 in the heat exchanger 82 to carry the hot exhaust gasses generated by the engine 32 to the heat exchanger 82. The exhaust pipe 84 is preferably insulated to maximize the amount of thermal energy carried by the hot exhaust gasses to the heat exchanger 82. The end of the primary coiled tubing 86 carries the exhaust gasses to a muffler 88, and then either directly to the atmosphere or first through a liquid/charcoal based purification system. The heat exchanger 82 is preferably filled with a heat conducting liquid, such as oil, so as to conduct the heat from the primary coil 86 to a secondary coiled tubing 90. A fluid can be pumped through the secondary coil tubing 90 via the inlet pipe 92 and outlet pipe 94 for use by a user of the portable power generator 10. Alternatively, the heat exchanger 82 may not be equipped with a secondary coil tubing, or a thermal liquid, but rather could have a fan that passes air past the primary coil tubing 86 and transfers heated air to a room, tent, etc., via an outlet of the heat exchanger case. As a further alternative, the secondary coil 90 can be omitted and a liquid (such as water) can be passed into the case of the heat exchanger 82 and around the primary coil 86 and out of the case to provide heated liquid for use by the user of the system 10. The heated water can be coupled to a hand-held shower head.

A catalytic converter (not shown) can be placed in the engine exhaust line before the heat exchanger 82 where high exhaust temperatures exist, to remove the noxious components of the exhaust fumes. The output of the muffler 88 can be coupled through a hollow flat top hot plate 89 to heat food, maintain the food or drinking liquids heated, and/or to provide heat radiated therefrom for the user. The hot exhaust gasses pass through the hollow hot plate 89 and are exhaust therefrom to an area removed from the hotplate 89. Thus, heat is provided by the engine 32 at the same time as providing AC and DC power.

According to an important feature of the invention, the engine 32 can drive a pressure washer pump 96 as a mechanical load 66. The pressure washing system is illustrated in FIG. 4 in broken lines. The pressure washer pump 96 can pressurize water alone, or the water can be mixed with a cleaning solution to clean surfaces and remove residue, oils, etc. A source of water or a mixture of water and a cleaning solution is shown as numeral 98. It is well known that when the pressurized water is heated, the efficiency with which the residue is removed is much improved. To that end, the water to be coupled to the pressure pump 96 can be heated with the heat exchanger 82 so that the cleaning process is expedited and made more efficient. Typically, the pressurized liquid is coupled to a hand-held wand 100 so that the operator can control the flow of pressurized liquid and the location to which the stream of pressurized liquid is directed. In order to facilitate cleaning of difficult residue from surfaces, an abrasive 102 can be either injected or pulled (by venturi action) into the downstream part of the wand so that the impact of the abrasive particles will abrade the residue and facilitate removal thereof. This is an improvement in typical sand blasting operations which are effective, but generate substantial dust as a result. The abrasive mixed with a liquid eliminates the air borne dust, which is then simply washed away from the surface without presenting an environment that is unsafe to breath.

A pressurized solvent or cleaning solution can also be injected into a port just before reaching the wand 100. When it is desired to flood the area to be cleaned with a cleaning solution which is not under a high pressure, much like typical hand held car washers, a button or switch can be operated by the user to remove the high pressure by the pump 96 and inject the pressurized cleaning solution itself through the wand onto the area to be flooded. After flooding the area with a cleaning solution, the switch can be released so that the pump 96 is again operated to pressure wash the flooded area with water.

Figure 5:
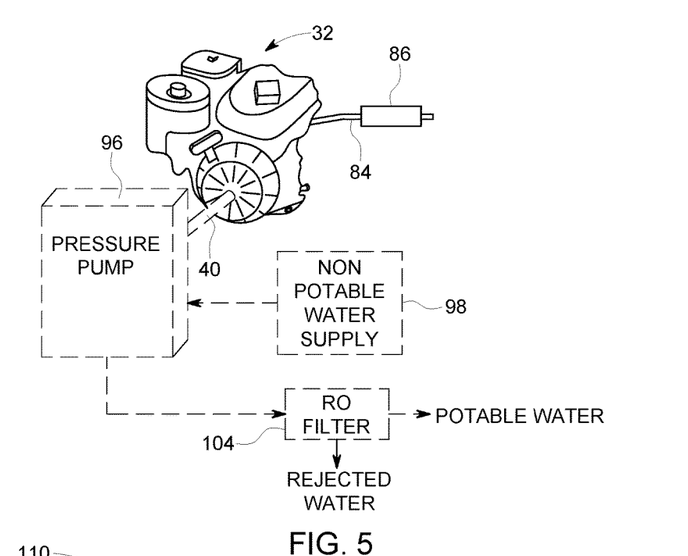
FIG. 5 is a diagram of a portable power generator providing potable water from a source of non-potable water.

FIG. 5 illustrates an embodiment in which the pressure pump 96 can be utilized with a reverse osmosis (RO) filter 104 to convert non-potable water to potable water. This feature can be important to persons temporarily or permanently living in locations where potable water is not available. For example, persons camping by or in the mountains, near oceans or seas where salt water is available, or deserted areas, can use the water from oceans, rivers, ponds and lakes and process the same through the equipment of FIG. 5 and produce drinkable water. The equipment can be employed in flood areas where the source of drinking water is often polluted, or water wells where the water is polluted or is of unknown purity. Pressure washers 96 are conventionally available for using high pressure water streams to clean surfaces. When desired, the pressure washer pump 96 can be removed from the pressure washer itself and mounted to the drive shaft 40 of the engine 32. Instead of using the high pressure wand 100, it can be disconnected from the high pressure hose and connected to an RO filter 104. Since RO filters 104 require high pressures to force the non-potable water through the filter membrane, such filters require specialized high pressure pump equipment. A pressure washer 96 can produce high pressure streams up to and exceeding 2,800 psi, at rates of over 2.3 gal/min. A typical RO filter may require water pressures of about 800-1,000 psi, and thus a pressure regulator may be required so that the RO filter 104 operates within an acceptable range of inlet pressures. Nevertheless, by using the pressure washer 96 with an RO filter 104, the output can produce a sufficient volume of drinking water for several persons per day, by operating the equipment only several minutes per day.

Figure 6:
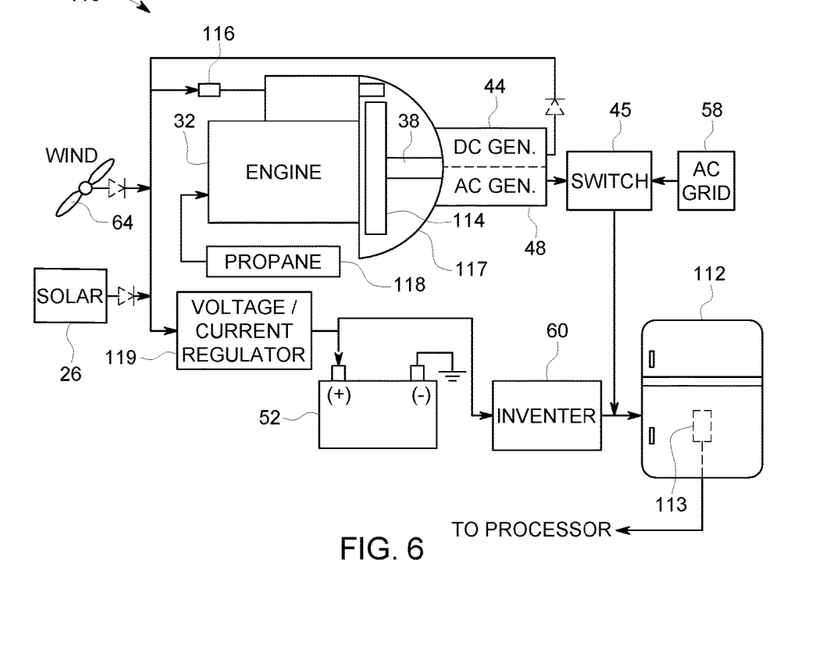
FIG. 6 is another embodiment of an AC and DC power generation system adapted for powering a refrigeration system.

FIG. 6 illustrates another embodiment of a portable power generator 110 adapted for providing standby AC and DC power to urgent appliances, such as a refrigerator 112 or freezer. In this embodiment, the system 110 includes a small engine 32 equipped with a flywheel 114 housed within a bell housing 117. The crankshaft 38 of the engine 32 drives the flywheel 114 together with a DC alternator or DC generator 44. The flywheel 114 provides rotary torque to provide energy for electrical surges, such as when the refrigerator 112 starts. The DC power output from the generator 44 drives a starter 116 to start the engine 32. A tank 118 of propane gas is shown as a source of fuel for the engine 32.

The DC power from the generator 44 is also coupled to a battery 52 to maintain it in a charged state. The DC power from the battery 52 is coupled to an inverter 60 that provides sine wave AC power to the refrigerator 112, freezer, or other appliance. The generator system 110 can also generate DC power using a solar panel 26 or a wind generator 64, which DC power is used to charge the battery 52. Diodes are employed to assure that DC current does not flow backwards into the DC generator, the wind turbine 64 or the solar panels 26. A voltage/current regulator 119 is employed to control the voltage and current provided to the battery 52. The three DC sources are under processor control and can be individually switched into operation to charge the battery 52. One or more of the DC sources can be switched into operation to either increase the charging capacity to the battery 52 or to provide the most cost effective DC source for charging the battery 52. An AC generator can be incorporated to directly provide AC energy to appliances 112, or the processor 34 can switch the AC source with switch 45 between the AC generator and the AC grid 58. In this event, the inverter 60 is disabled by the processor 34.

The refrigerator 112, for example, can provide refrigeration to the contents thereof by conventional means. However, the inside temperature of the refrigerator 112 can be controlled not by the internal thermostat, but by a temperature probe 113 placed inside the refrigerator, where the temperature probe 113 provides a temperature indication to the processor 34. In response to the internal temperature of the refrigerator 112, the processor 34 applies AC power to the refrigerator 112 when it is desired to reduce the internal temperature, and interrupt the AC power to the refrigerator 112 when the temperature reaches a set amount. The user can enter the desired temperature (set point) via the user interface 37 to the processor 34, which stores the same until changed by the user.

Figure 7:
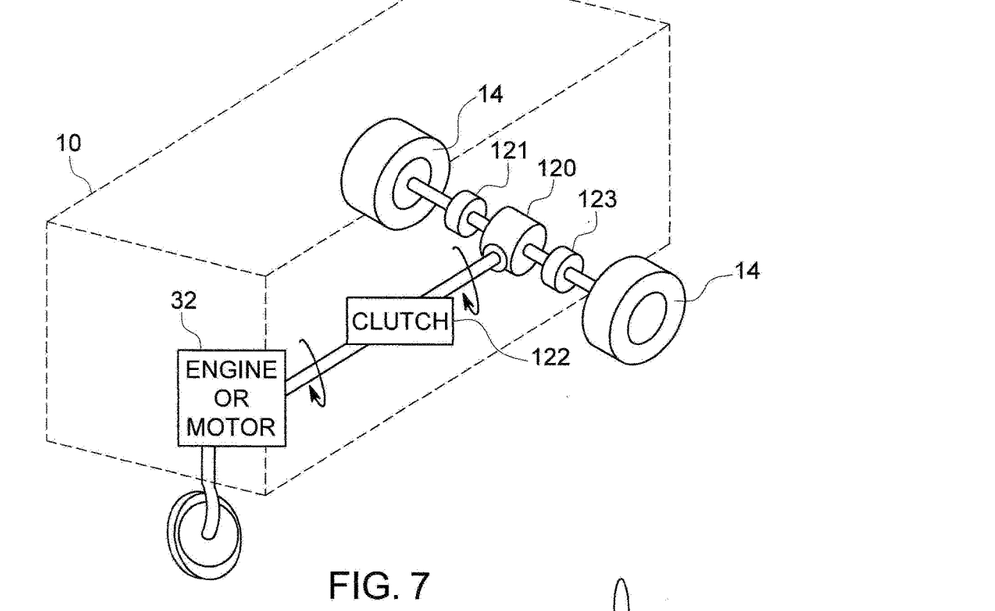
FIG. 7 is another embodiment of the portable power generator, in which the engine can be used to move the mobile cart from location to location, as well as adjust the orientation of the system to dampen the sound to users, and to align the system solar panels with the sun.

The portable cart 11 can be easily moved from one location to another by using the engine 32 to drive the wheels 14 of the cart 11. This is illustrated in FIG. 7. The wheels 14 can be connected to respective outer ends of axles, and the opposite inner ends of the axles are connected to a differential 120, or the like. A respective brake 121 and 123 can be individually engaged with each of the axles to slow down the rotational speed or stop the respective axles. It is well understood that when using a differential 120, if one axle is stopped or slowed down, the other axle will correspondingly increase in speed. The cart 11 can be rotated about a vertical axis in one direction by use of one of the brakes 121, and can be rotated in the opposite direction by use of the other brake 123. By use of the brakes 121 and 123, the cart 11 can be rotated to align the solar panels 26 with respect to the sun, or to align the wind turbine 64 with respect to the wind. When the cart 11 is configured to rotate about an axis using the brakes 121 and 123, a front wheel can be mounted to the front of the cart 11 to allow such rotation. The front wheel can be of the caster type which freely rotates about a vertical axis.

The engine 32 or a DC motor can be connected to a clutch 122, which can be hand or processor operated by the user via the user interface 37. The drive mechanism for allowing the engine 32 to drive the wheels 14 can be much like that employed in many self-propelled lawn mowers. The clutch 122 can be of the hand operated by a switch mounted to the handle bar 16 of the mobile cart 11. The clutch 122 can also be of the magnetic operated type that is processor controlled. This feature can facilitate the movement of the cart 11 from a pick-up truck bed to a location where it is to be operated. It can be appreciated that with the engine, fuel, the generators and batteries, the cart 11 can be heavy and hard to push or pull up small grades. The engine 32 can be started and then the clutch 122 engaged so that the cart 11 will move under the power of either the engine 32 or the DC motor. At the same time, the handle 16 can be maneuvered so that the cart 11 will move in the desired direction. The drive equipment can also be engaged when moving the cart 11 downhill so that it does not gain too much speed—much like using a brake. Both brakes 121 and 123 can be used to also maintain a desired downhill speed of the cart 11. Those skilled in the art may prefer to employ four wheels for the mobile driven cart 11, so that the two front wheels can turn about a vertical axis to guide the cart 11 by moving the handle 16 horizontally left or right, much like a child's play wagon.

Figure 8:
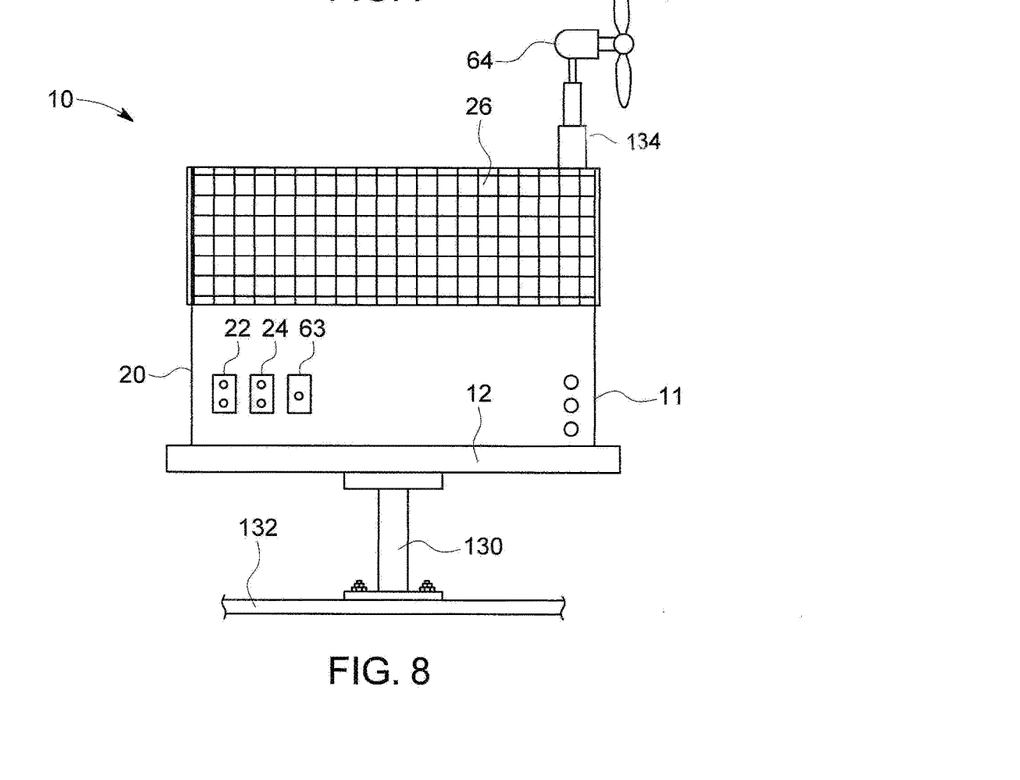
FIG. 8 illustrates the portable power generator mounted to a rotatable pedestal, where the pedestal is mounted to a fixed surface.

FIG. 8 illustrates the cart 11 mounted to a pedestal 130 which, in turn, is mounted to a fixed surface such as the bed of a truck or the bed of a trailer. The cart 11 is equipped with solar panels 26 and a wind turbine 64 and the other electrical apparatus described above. The cart 11 is rotatable by a DC motor connected to the pedestal 130 so that the cart 11 rotates with respect to the pedestal 130. The DC motor is processor controlled so that the cart 11 can be rotated to maximize the incidence of light onto the solar panels 26, or to maximize the incidence of wind onto the blades of the wind turbine 64. The cart 11 is also rotatable to turn in a direction so that the exhaust of the engine 32 is directed away from the area of the site occupied by the user. This also minimizes the noise of the engine 32 directed to the site area of the user. Thus, at night time in a camping park, the cart 11 can be oriented so that the engine noise is directed generally away from the population.

It may be desired to orient the cart 10 so that the solar panels 26 are directed to the sun, and the wind turbine 64 receives the maximum effect of the wind. In this event, the rotation of the cart 11 can be achieved to correctly orient the solar panels 26 with respect to the sun. The wind turbine 64 can be mounted to a telescopic and rotatable shaft 134. The shaft 134 can be telescopic by using a first DC motor, and rotatable by using a second DC motor, where both DC motors are controlled by the processor 34. With this arrangement, the second DC motor can be operated to rotate the wind turbine 64 so that the blades thereof receive the maximum effect of the wind. The direction and magnitude of the wind can be determined by conventional means, and sensed by the processor 34. When it is desired to move the cart 11 from one location to another, the telescopic shaft 134 can be collapsed to minimize the height of the cart 11.

A number of other features can be added to the mobile cart 11, such as a communication center that is powered by the AC and/or DC generators of the portable power generator 10. The communication center can include a radio, television, computer, Internet access, cell phone charger, etc., all integrated into the mobile generator system 10. The mobile cart 11 can also be equipped with an emergency beacon or transmitter for transmitting a signal indicating a need for assistance or help. The emergency beacon can be manually activated by pushing a button or inputting a code via a keypad for purposes of security. The keypad can be a part of a security system for preventing unauthorized use of the equipment of the mobile cart 11. For example, the equipment can only be activated by entry of a password via the keypad, whereupon the engine can be started and the other equipment can provide AC and/or DC power to the accessories and appliances. The cart 11 can also be equipped with a telemetry system to allow the user to control the cart apparatus from a remote location. A cell phone can be used to access the apparatus of the cart 11 to view the current operation and status of the various components, and to remotely operate different components. The cart 11 can also be equipped with a video camera that can be remotely controlled so that the user can view the surrounding area of the cart 11. An intrusion sensor can be provided so that when an unauthorized person approaches the cart 11, the user is notified via the telemetry system and the user can orient the camera to view the intruder, or input information so that the processor 34 disables the portable power generator 10.

Before the emergency beacon is activated, such as by inputting a first password to activate use of the cart 11, a second code can be input to activate the emergency beacon. This can be done before the users go for a hike or are otherwise absent from the site for a predetermined time. A time parameter can be input via the keypad as an estimate of the time the users will be gone, plus some extra time as a guard band. Then the users can go on the hike, and when they return, another code can be entered via the keypad to disable the emergency beacon so that it will not go into the transmission mode. Otherwise, the emergency beacon will commence transmitting a special signal to alert authorities that the hikers have not returned and a possible dangerous or emergency situation may exist. As a reminder that the beacon is activated and is about to transmit the emergency signal, a periodic audible tone can be transmitted so that the users will recall that the beacon will go into the transmission mode in fifteen minutes, for example, unless the deactivation code is entered into the user interface 37. The input of a disable code in important to prevent unauthorized persons from purposefully deactivating the emergency beacon when it should not be deactivated.

One or more of the wheel axles can be equipped with a magnet that passes by a stationary magnetic receiver fastened to the cart 11 to detect movement of the cart 11. Optical or other sensors can also be employed to detect movement of the cart 11. With this equipment the processor 34 can sense the movement of the cart 11 and sound an alarm (horn, buzzer, bell or lights) both locally and remotely by the telemetry. The alarm system can be activated by the user via the user interface 37. Fire and smoke sensors can also be utilized to also provide alarms to the user. The programmed processor 34 can also be programmed with a password, input via the user interface 37, to allow only authorized users to activate the entire generator system 10 and allow commencement of the generation of AC and DC power. The duration of time of the use of the generator system 10 can also be input by the user so that after the set time, the operation of the unit 10 terminates. Additional security equipment can also include a beacon or flood light that is illuminated should an intruder enter the area surrounding the cart 11. A motion detector can be employed to detect the presence of persons or animals that approach the area of the cart 11. The beacon can also be illuminated and rotated so that if the user is away for more than a predetermined time, as entered by the user via the user interface 37, the beacon will be activated to enable the user to see the same from a distance and provide guidance of the user to the cart 11, especially during times of darkness.

As a safety feature to the operation of the portable power generator 10, a carbon monoxide sensor can be employed to sense dangerous carbon monoxide levels that may exist in the vicinity of the portable power generator 10, and activate one or both of visible or audible alarms. The cart 11 can then be rotated or otherwise moved (automatically or manually) to clear the living area of the carbon monoxide fumes.

As an additional safety feature, the portable power generator 10 can be equipped with fire sensors to detect fire, flames or smoke adjacent to the equipment. When a fire is detected, fire suppression equipment can be activated by the processor 34 in an attempt to extinguish the fire and avoid further damage to the generator system 10.

While the portable power generator 10 is described in connection with equipment of specified sizes or capabilities, it should be understood that the generator system 10 is scalable so that it can be constructed with components that produce less power than described, or provide power capabilities greater than described.

Figure 9:
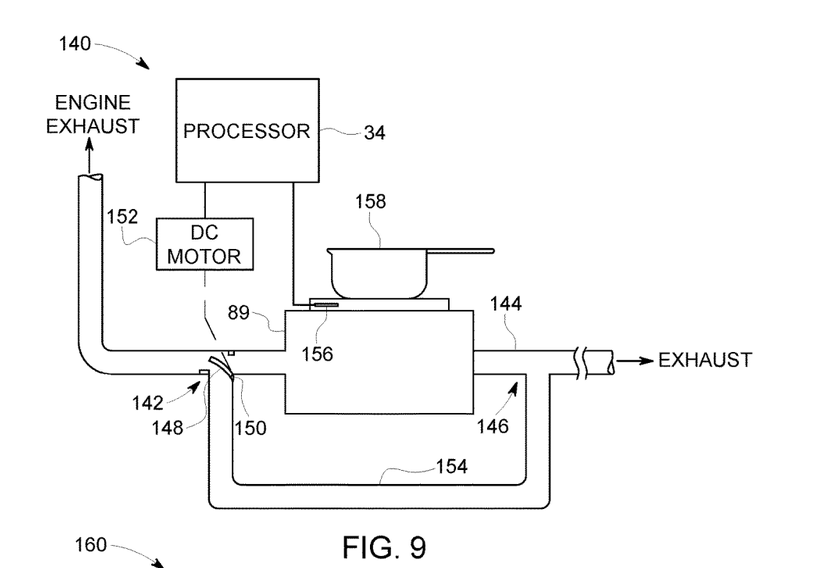
FIG. 9 is a diagram of a technique to regulate the degree in which the flat top stove is heated by the engine exhaust.

FIG. 9 illustrates a technique for controlling the temperature of the flat top stove 89 of FIG. 4. As noted above, the flat top stove 89 is heated by the hot exhaust gasses passing through the enclosure of the stove 89. It can be appreciated that the exhaust gases emitted from the engine 32 can be very hot. As such, the top of the stove 89 can often become overheated and can burn the food that may be resting on the flat top surface of the stove 89. A technique for controlling the temperature of the stove 89 includes a T-shaped pipe 142 having a top lateral part and a bottom vertical part. The hot exhaust gasses can pass through the top lateral part of the T-shaped pipe 142 to the internal space of the stove 89 and heat all of the surfaces thereof. The hot gasses pass through the stove 89 and to an exit pipe 144 to the atmosphere.

A second T-shaped pipe 146 is connected in the exit pipe 144, as shown. The vertical parts of both T-shaped pipes 142 and 146 are connected together with a bypass pipe section 154. The volume of the hot exhaust gasses that pass into the enclosure of the stove 89 is controlled by a hinged valve or damper 148. The damper 148 is pivotal about the axle 150. A DC motor 152 is operatively connected to the damper axle 150 to rotate the damper 148 between a position that closes off the entry of exhaust gasses to the bypass pipe section 154, and a position that closes off the entry of the exhaust gasses to the enclosure of the stove 89. The DC motor 152 can be controlled by the processor 34 to rotate the damper 148 between these positions, as well as any intermediate position.

It can be appreciated that the temperature of the top surface of the stove 89 is a function of the volume of the hot exhaust gasses passing through the stove enclosure. The volume of the hot exhaust gasses is controlled by the damper 148, as noted above. The damper 148 can be adjusted to allow more exhaust gasses to pass into the enclosure of the stove 89 to increase the temperature of the flat top. Conversely, the damper 148 can be adjusted to allow less exhaust gas to pass into the stove enclosure to decrease the temperature thereof. The set point of the temperature of the flat top part of the stove 89 can be input into the processor database via the user interface 37. Alternatively, the temperature of the flat top part of the stove 89 can be set by a temperature knob (not shown) attached to the frontal part of the stove 89. The temperature knob could be attached to a variable resistor, the resistance of which is an indication of the desired temperature of the stove 89. The resistance of the variable temperature resistor would be monitored by the processor 34.

The processor 34 controls the position of the damper 148 in a closed loop system which also includes a thermistor 156 attached to or embedded in the top surface of the stove 89. The thermistor 156, or other temperature sensing device, senses the temperature of the top flat surface of the stove 89 and provides an electrical indication thereof to the processor 34. The processor 34 then adjusts the position of the damper 148 to allow a volume of the hot exhaust gas to pass past the damper 148 to the stove enclosure so that it heats to the desired temperature. If the temperature of the flat top part of the stove 89 varies from that desired, due to wind conditions, a cold pan 158 being placed on the flat top, or other variables including the throttle setting of the engine 32, then the damper 148 will be automatically adjusted by the processor 34 so that the flat top part of the stove 89 again reaches the desired temperature.

Figure 10:
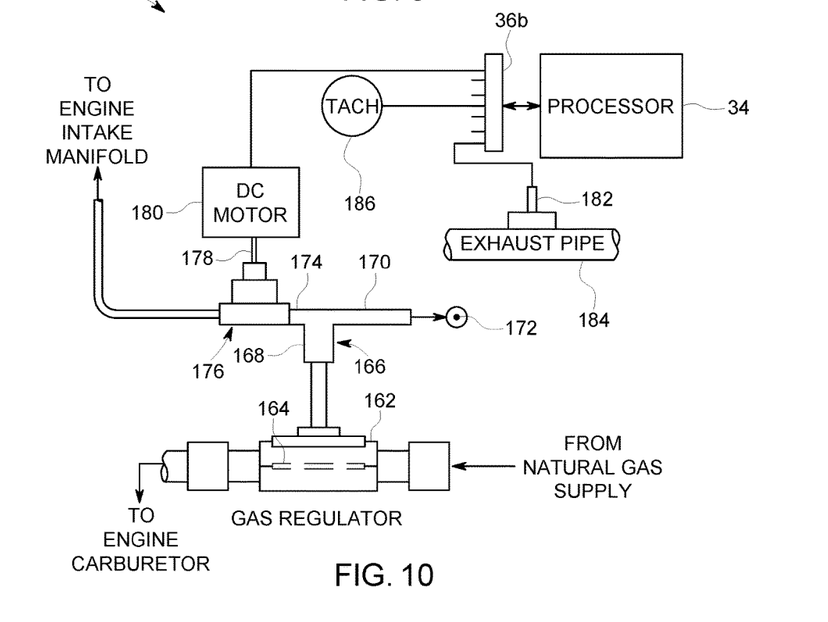
FIG. 10 is a diagram of apparatus for maintaining the correct air/fuel mixture for a natural gas engine.

Another feature of the invention is the air/fuel control for regulating the amount of natural gas mixed with the air and coupled to the engine 32. It is commonly known that as the speed of an engine varies, the air/fuel ratio should also be varied to maintain optimum operation of the engine 32. FIG. 10 illustrates the apparatus of a technique for controlling the air/fuel ratio of the mixture that is combusted by the engine 32. Conventional natural gas or propane gas regulators 162 employ a diaphragm 164 having one side coupled to the atmosphere. The diaphragm 164 moves to regulate the amount of gas that is coupled through the regulator 162 to the appliance using the natural or propane gas. The air/fuel ratio control of the invention modulates the atmospheric air side of the gas regulator diaphragm to vary the amount of gas mixed with the natural gas to optimize the operation of the engine 32.

In order to assure that the engine 32 operates efficiently and conserves fuel as well as produces the maximum horsepower at the various speeds, it is necessary to control the air/fuel mixture ratio. With a natural gas or propane engine 32, it can become troublesome to accurately control the mixture ratio with conventionally available gas regulators. FIG. 10 illustrates a natural gas mixture control 160 constructed for use with the engine 32 described above.

Illustrated is a traditional natural gas or propane gas regulator 162 of the type that regulates gas with a diaphragm 164. The top of the diaphragm 164 is typically open to the atmosphere to thereby allow atmospheric pressure to act on the top surface of the diaphragm 164. One end of the regulator 162 is connected to a supply of natural or propane gas. The other end of the regulator 162 is connected to the carburetor (not shown) of the engine 32.

The port of the regulator 162 that is normally coupled to the atmosphere is connected to the bottom leg 168 of a tubular T-shaped member 166. One end 170 of the crossbar of the T-member 166 is closed except for a small pinhole 172 that couples atmospheric pressure to the internal part of the T-member. The pinhole 172 functions as an orifice to prevent the pressure/vacuum inside the T-member from fluctuating quickly during operation. The other end 174 of the crossbar of the T-member is connected to a valve 176. The valve 176 is of the type having a needle valve that moves up and down as a function of the depth by which the stem 178 moves up and down. The needle valve stem 178 is threadably connected inside the body of the valve 176 to throttle the air passage through the valve 176. A tapered end of the needle valve moves toward and away from a seat to vary the opening of the seat orifice. A reversible DC motor 180 has a rotatable shaft connected to the needle valve stem 178. Rotation of the motor 180 is effective to move the needle valve downwardly to restrict the flow of air through the valve 176, and when the rotation of the motor 180 is reversed, the needle valve moves upwardly to open the passage and allow more air to pass through the valve 176. The valve 176 is of conventional construction and is readily available. The motor 180 is electrically connected to the processor interface 36b and is thereby controlled by the programmed processor 34.

The inlet end of the valve 176 is connected to the intake manifold of the engine 32 and thus provides a small vacuum to the inlet end of the valve 176. In practice, the inlet end of the valve 176 is coupled to the carburetor, upstream from the butterfly valve to provide a smooth source of vacuum to the valve 176. The processor 34 controls the air/fuel mixture applied to the carburetor of the engine 32 in a closed loop manner. To that end, the processor 34 monitors electrical signals from a wide band oxygen sensor 182 connected in the exhaust pipe 184 of the engine 32. The oxygen sensor 182 is of conventional construction and is readily available. Oxygen sensors typically provide signals indicative of the proper air/fuel mixture that is combusted in the cylinders of the engine 32.

In operation, and during start-up of the system, the processor 34 causes the motor 180 to rotate the needle valve stem 178 in a direction to close the air passage through the valve 176 and make the air/fuel mixture rich for starting the engine 32. This effectively allows the atmospheric air to slowly pass through the pinhole 172 located at the other end 170 of the T-member 166 and be applied to the top surface of the gas regulator diaphragm 164. After the engine 32 has been started and is up to operational temperature and speed, the processor 34 causes the motor 180 to move the valve stem 178 so as to raise the tapered point of the needle valve away from the seat to thereby open the passage of air through the valve 176. This allows the vacuum of the engine carburetor to be coupled to the internal area of the T-member and dominate over the atmospheric pressure coupled through the pinhole 172. Accordingly, the top of the gas regulator diaphragm 164 is exposed to the small vacuum to thereby lean the air/fuel mixture coupled to the carburetor. It can be seen that by varying the position of the needle valve inside the valve 176, the pressure applied to the top surface of the regulator diaphragm 164 varies from atmospheric pressure to a lower pressure, as a function of the amount of vacuum that is allowed to pass through the needle valve orifice and into the internal space of the T-member 166. The processor 34 continuously monitors the oxygen sensor 182 to determine if the engine air/fuel mixture is correct to assure that optimum combustion performance exists. During operation of the engine 32 the processor 34 continues to adjust the needle valve to adjust the air/fuel mixture to assure that as the speed of the engine changes, the proper air/fuel mixture is coupled to the carburetor. The engine speed of the engine 32 can be processor monitored by monitoring a tachometer 186.

While the preferred and other embodiments of the invention have been disclosed with reference to specific portable power generator components, and associated methods of operation thereof, it is to be understood that many changes in detail may be made as a matter of engineering choices without departing from the spirit and scope of the invention, as defined by the appended claims.

What is claimed is:

1. An AC/DC power generation system, comprising:
a DC alternator for providing DC power to a DC outlet;
an AC generator for providing AC power to at least one AC outlet;
an internal combustion engine having a drive shaft with an end extending from each side of said engine, a first drive shaft end for driving said AC generator;
said engine driving said DC alternator;
a hand-held wand for directing a high pressure stream of water to a surface to be cleaned;
a reverse osmosis filter for receiving high pressure water to be purified;
a pressure pump driven by a second drive shaft end of said engine, said pump providing high pressure water that is switchable to either said hand-held wand or to said reverse osmosis filter;
whereby operation of said engine to provide AC power also drives said pump; and
a wheeled cart for carrying equipment including said DC alternator, said AC generator, said engine, said reverse osmosis filter so that said equipment is made portable, said wheeled cart adapted for moving by a user on off road trails.

2. The AC/DC power generation system of claim 1, further including an abrasive that is injected into the water stream of said water pump.

3. The AC/DC power generation system of claim 1, wherein said cart further includes a cook-top stove integrated into a cabinet holding the power generation equipment said cook-top stove is heated by hot exhaust gas fumes exhaust by said engine.

4. The electrical power generation system of claim 3, further including a tubing arrangement for coupling hot exhaust fumes from said engine to said cook-top stove, and further including a damper for controlling the amount of hot exhaust fumes that is coupled to said cook-top stove to control a temperature of said cook-top stove, and a remainder of said hot exhaust fumes bypass said cook-top stove in said tubing arrangement.

5. The electrical power generation system of claim 4, further including a programmed processor for controlling various functions of said electrical power generation system, and wherein said processor is programmed to be responsive to user inputs for controlling a position of said damper to thereby control an amount of the hot exhaust fumes passed to said cook-top stove to thereby maintain a temperature thereof as determined by the user.

6. The AC/DC power generation system of claim 1, further including a drive mechanism in which said engine drives the wheels of the cart, said cart including a tongue connected to at least one front wheel of said cart for allowing the user to manipulate the tongue and determine a direction of travel of said cart, and including a clutch for engaging and disengaging the engine drive from the at least one front wheel.

7. The AC/DC power generation system of claim 1, further including an emergency beacon transmitter attached to the cart, and a keypad into which a first code is input by the user to arm the emergency beacon transmitter for enabling the emergency beacon to transmit a help signal when the user is away from the power generation system more than a predefined amount of time and who has not returned to disarm said emergency beacon, and a second code is input by the user to disarm the emergency beacon transmitter when the user has returned within the predefined amount of time.

8. The electrical power generation system of claim 1, wherein said engine can move said cart to an orientation to improve an incidence of sunlight directed to said solar panel.

9. An electrical power generation system, comprising:
a wheeled cart for transporting said power generation system, said wheeled cart having a steering mechanism manipulated by a user of said wheeled cart for guiding said cart during transport thereof;
an internal combustion engine;
said cart constructed with one or more drive wheels that are driven by said engine, whereby the user can guide said wheeled cart during transport while said engine provides power to move said cart, and said wheeled cart can be transported and guided by the user using said steering mechanism along a path when said engine is not providing power to said drive wheels;
an AC generator driven by said engine, and including at least one AC outlet for delivering AC power from said AC generator;
a solar panel providing DC power;
an AC power inlet adapted for receiving AC power from an AC grid, and an AC power outlet for delivering AC power from the AC grid;
a battery providing DC power, said battery charged by said solar panel;
a battery charger driven by said AC generator to charge said battery; and
a DC power outlet allowing a user of the cart to plug DC apparatus into said DC power outlet.

10. The electrical power generation system of claim 9, wherein when said engine drives said drive wheels, said engine functions as a brake when said wheeled cart is transported downhill.

11. The electrical power generation system of claim 9, wherein said engine drives said drive wheels via a differential.

12. The electrical power generation system of claim 9, wherein said drive wheels can alternatively be driven by a DC motor driven by said battery.

13. The electrical power generation system of claim 9, wherein said wheeled cart further includes a handle connected to one or more steerable front wheels of said wheeled cart, where said handle is manipulated by the user to turn said wheeled cart in a direction to which said wheeled cart is to be steered.

14. An electrical power generation system, comprising:
a mobile wheeled cart adapted for transporting said power generating system in a wilderness area, said cart adapted for being equipped with wheels:
an internal combustion engine;
an AC generator driven by said engine;
an AC power outlet allowing a user of the cart to plug AC apparatus into said AC power outlet;
a solar panel providing DC power;
a battery and a battery charger for charging said battery;
an emergency beacon for transmitting a signal indicating a need for help;
a keypad for entry therein of data for controlling said emergency beacon;
a processor programmed to respond to data input by a user of the system for controlling said emergency beacon;
said processor programmed to respond to data input via said keypad to:
a) respond to a first security code input by the user of said system for allowing said engine to be started;
b) respond to an input by the user of said system for arming said emergency beacon;

c) respond to data input by the user of said system for setting a time period after which said emergency system is activated to transmit an emergency signal, where the user can be absent from the vicinity of said system during such period of time;
d) respond to data input by the user of said system when returning within said period of time to disarm said emergency system; and
e) respond to the expiration of said time period if the user did not return and input the code to disarm said emergency system by activating said emergency beacon to transmit a signal indicating a need for help by the user of the system.

15. The electrical power generation system of claim 14, wherein said disarm data is secret data so that unauthorized disarming of said emergency beacon cannot be achieved by an unauthorized person while the user is absent from said system.

16. The electrical power generation system of claim 14, further including a rotatable pedestal on which said cart is mounted, and further including a sensor for sensing an intensity of sunlight, and said processor is responsive to said sensor to rotate said pedestal to an orientation so that the intensity of sunlight received by said solar panel is maximized.

* * * * *